United States Patent
Dahan et al.

(10) Patent No.: US 12,132,857 B1
(45) Date of Patent: Oct. 29, 2024

(54) SMARTPHONE THAT IS AUTOMATICALLY CHANGED TO A RINGING MODE AFTER PERFORMING PREDETERMINED NUMBER OF VIBRATIONS

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

( * ) Notice: Subject to any disclaimer, the term of this patent is extended or adjusted under 35 U.S.C. 154(b) by 0 days.

(21) Appl. No.: 18/765,263

(22) Filed: Jul. 7, 2024

(51) Int. Cl.
*H04M 19/04* (2006.01)

(52) U.S. Cl.
CPC ................. *H04M 19/047* (2013.01)

(58) Field of Classification Search
CPC ..... H04M 19/047; H04M 19/04; H04M 19/02
See application file for complete search history.

(56) References Cited

U.S. PATENT DOCUMENTS

| | | | | |
|---|---|---|---|---|
| 9,232,369 B1* | 1/2016 | Fujisaki | ................ | H04M 3/533 |
| 11,055,937 B2* | 7/2021 | Konicek | ............... | H04W 4/021 |
| 2009/0088221 A1* | 4/2009 | Gilbert | ............. | H04M 1/72451 |
| | | | | 455/567 |
| 2015/0087282 A1* | 3/2015 | Prajapat | ................ | H04M 19/04 |
| | | | | 455/418 |
| 2015/0208220 A1* | 7/2015 | Hulan | ..................... | H04W 4/90 |
| | | | | 455/404.1 |
| 2016/0205244 A1* | 7/2016 | Dvortsov | .............. | H04M 19/04 |
| | | | | 455/414.1 |

OTHER PUBLICATIONS

Le Besnerais, Jean, et al. "Characterization and reduction of audible magnetic noise due to PWM supply in induction machines." IEEE Transactions on Industrial Electronics 57.4 (2009): 1288-1295. (Year: 2009).*

Kogler, Andreas, et al. "Finding and Exploiting CPU Features using MSR Templating." 2022 IEEE Symposium on Security and Privacy (SP). IEEE, 2022. (Year: 2022).*

* cited by examiner

*Primary Examiner* — Sharad Rampuria

(57) ABSTRACT

A system for handling incoming calls by a smartphone that includes a processing device running on the smartphone that is configured to display on a screen of the smartphone a short-time-silent mode button to apply a short-time-silent mode, to apply the short-time-silent mode on the smartphone, to receive an incoming call when the smartphone is on the short-time-silent mode, to activate a vibration mechanism of the smartphone to perform a predefined number of vibrations when received the incoming call when the smartphone is on the short-time-silent mode, to disable a ring mechanism of the smartphone to ring when received that incoming call and during a performance of the predefined number of vibrations, and to transition automatically the smartphone to an audible ringing mode for enabling the ring mechanism to ring upon completing the performance of the predefined number of vibrations.

4 Claims, 1 Drawing Sheet

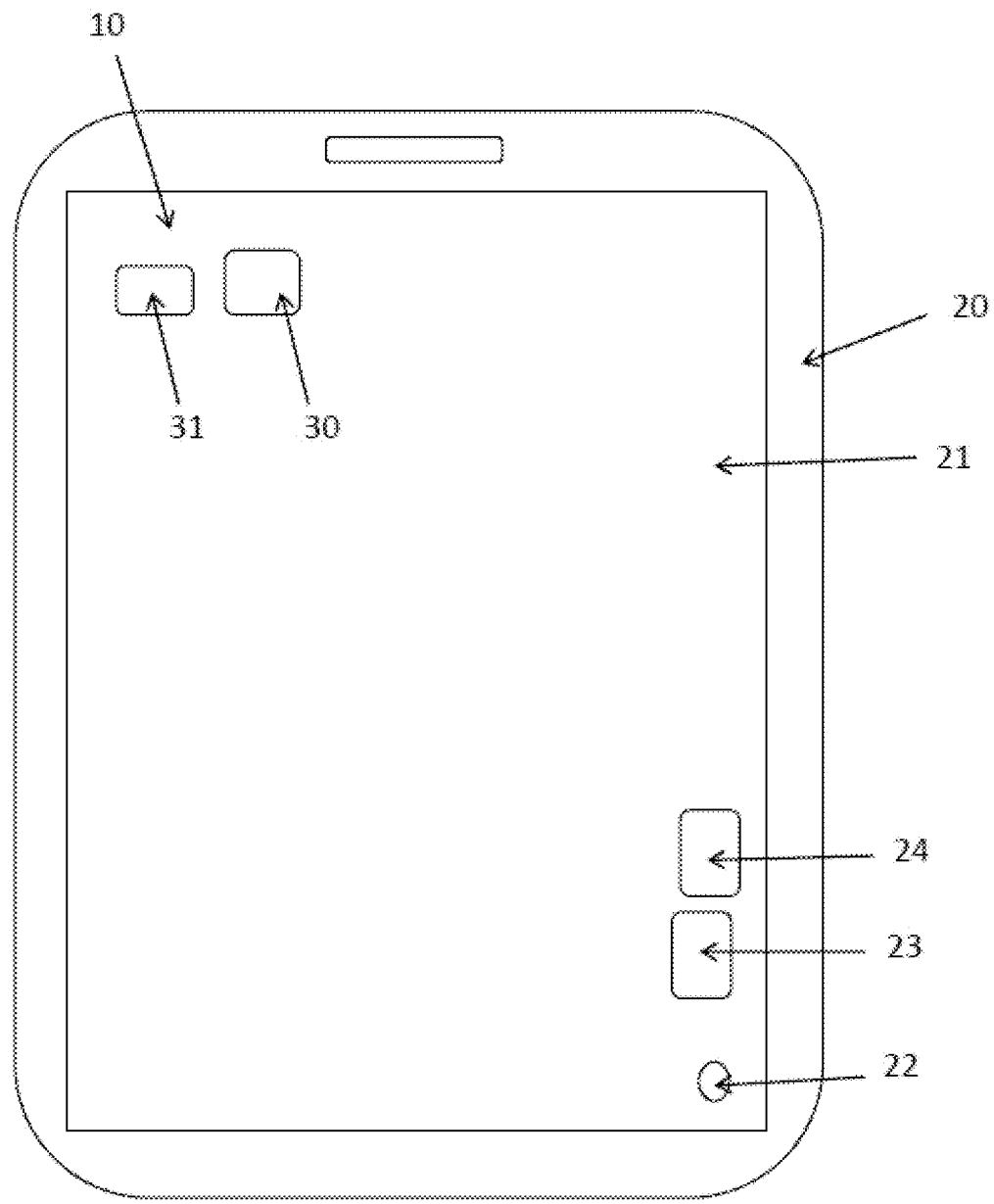

SMARTPHONE THAT IS AUTOMATICALLY CHANGED TO A RINGING MODE AFTER PERFORMING PREDETERMINED NUMBER OF VIBRATIONS

TECHNICAL FIELD

The present invention refers to a smartphone with a short-time-silent mode for automatically transition the smartphone form a vibration mode to an audible ringing mode after performing predetermined number of vibrations.

BACKGROUND ART

In many cases smartphones users can receive incoming calls and talk on the smartphones but it is unpleasant or undesirable to hear the ringing of the incoming calls. In such cases, the users can put the smartphones on silent but vibrate mode, so the ringing mechanism is disabled but they will notice the vibration and answer the call. However, there are situations where the users place the smartphone at a short distance from them, and therefore if they cannot notice the vibration of the device they will miss the call. The present invention comes to answer such and other cases.

DESCRIPTION OF THE DRAWINGS

The intention of the drawings attached to the application is not to limit the scope of the invention and its application. The drawings are intended only to illustrate the invention and they constitute only one of its many possible implementations.

FIG. 1 is a schematic depiction of the system (10) and the smartphone (20).

THE INVENTION

The main objective of the present invention is to provide a system (10) for handling incoming calls by a smartphone (20) that comprises a processing device (30) running on the smartphone. The term "a processing device" means a processor, that can be one or more, and that may include, inside or nearby, a memory (31) that is positioned together with the processing device inside the smartphone. FIG. 1 is a schematic depiction of the system (10) and the smartphone (20). The system is configured to:

A. Display by the processing device on the screen (21) of the smartphone a short-time-silent mode button (22) that is configured to apply a short-time-silent mode on the smartphone for a predetermined number of vibrations. The term "predetermined number of vibrations" means a short-time that can last between two seconds to two minutes (but can be more or less) and the specific number of vibration is not the issue, but it is a way to give the impression as to the short time of this time in which the ringing mechanisms is disabled; this term can be a predetermined number of rings (as the caller hear when waiting that his call will be answered) or predetermined period of time per-se. The predetermined number of vibrations may be configurable by the user, for example, through the settings of the smartphone or when applying the short-time-silent mode.

B. Receive, by the smartphone when is on the short-time-silent mode, an incoming call.

C. Disable by the processing device a ring mechanism (23) of the smartphone to ring when received the incoming call and during the performance of that predetermined number of vibrations. It means that during the time of performing this predetermined number of vibrations the ring mechanism does not ring and the smartphone is on silent (though on vibration mode).

D. Activate by the processing device a vibration mechanism (24) of the smartphone to perform this predetermined number of vibrations when received that incoming call.

E. Automatically transition by the processing device the smartphone to an audible ringing mode for enabling the ring mechanism to ring after performing the predetermined number of vibrations.

The short-time-silent mode gives a good solution that the prior do not provide. For example, a person is at a large dinner party or cocktail party where everyone is talking to everyone else. This person can talk on the smartphone and that is perfectly fine because everyone is talking anyway, but making the place noisy with smartphone rings is a disturbing thing because it distracts those present, as opposed to talking into the phone which is not distracting, since everyone is there chatting. If the user has put the smartphone aside for some reason, then if he does not answer within a few vibrations (a short time), then the phone will go into ring mode and he will not miss the call. But if the person holds the smartphone or that it is in his pocket or his bag, he can feel/notice the vibrations and answer the call and there is no need that the device will ring, that may annoy even the user.

In general, it is even desirable that this short-time-silent mod be the default. In any case, the device is almost always in the user's hand, pocket, and bag or placed next to him and he can notice the vibrations that signify an incoming call. In cases where it is a little far away, the phone will ring a few seconds after the call is received. In this way, it will not be necessary to hear the annoying ringing of the phone (of the user and of those who are near him).

It is possible to define the present invention as a smartphone (20) that is designed to handle the incoming calls that comprises the processing device (30) and the memory (31) that stores instructions executable by the processing device. The processing device and the memory are configured to: (a) activate a silent mode in response to an incoming call; (b) initiate, by the vibration mechanism (24) of the smartphone, a vibration sequence for the predetermined number of vibrations upon receiving the incoming call; (c) transition the smartphone automatically to the audible ringing mode when the incoming call is not answered after performing said predetermined number of vibrations; and (d) ring the smartphone, by operation of the ring mechanism (23) of the smartphone. The predetermined number of vibrations may be configurable by the user, for example, through the settings of the smartphone.

The term "button" in this disclosure and in the claims means any kind of symbol or icon of graphic that is designed to be displayed on a touchscreen of the smartphone, as customary used in smartphones, or function of the smartphone without viewable graphic. It is possible that one icon will serve as two or more buttons and the touch screen itself can be used and served as all the buttons or part of them by tapping on the screen, sliding fingers on it and the like. The button can be hidden in a way that the function of the buttons can be done simply by tapping on the touch screen or on part of it or sliding fingers. For example, tapping twice quickly on the voice message icon will generate and display the generated keywords and pressing long press about three seconds will enable the user to type the user's own self-written keywords.

What is claimed is:

1. A system for managing incoming call alerts on a smartphone, said smartphone comprising a processing device, a vibration mechanism, and a ring mechanism, the system configured to:

receive an incoming call when the smartphone is in a short-time-silent mode;

activate the vibration mechanism to perform a predefined sequence of vibrations as a non-audible alert for the incoming call;

disable the ring mechanism to prevent audible alert during the performance of said predefined sequence of vibrations; and automatically transition the smartphone out of the short-time-silent mode and re-enable the ring mechanism to generate an audible alert upon completion of the predefined sequence of vibrations.

2. The system of claim 1, wherein said predefined sequence of vibrations is configurable by a user of said smartphone.

3. A smartphone configured to manage incoming call alerts, the smartphone comprising a processing device, said processing device configured to:

(a) activate a vibration mechanism of the smartphone to produce a predefined sequence of vibrations upon receiving an incoming call when the smartphone is in a short-time-silent mode, said predefined sequence serving as a non-audible alert for the incoming call;

(b) disable an audible ring mechanism of the smartphone during the performance of the predefined sequence of vibrations; and (c) automatically transition the smartphone out of the short-time-silent mode and re-enable the ring mechanism to generate an audible ring upon completion of said predefined sequence of vibrations.

4. The smartphone of claim 3, wherein said predefined sequence of vibrations is configurable by a user of the smartphone.

\* \* \* \* \*